May 14, 1957  L. B. JACQUART  2,792,236
FRONT WHEEL SUSPENSION FOR TWO-WHEELED VEHICLE
Filed May 5, 1954

INVENTOR.
LIONEL B. JACQUART
BY
Richard P. Cardew
AGENT

United States Patent Office 2,792,236
Patented May 14, 1957

2,792,236

FRONT WHEEL SUSPENSION FOR TWO-WHEELED VEHICLE

Lionel B. Jacquart, Ironwood, Mich.

Application May 5, 1954, Serial No. 427,709

3 Claims. (Cl. 280—276)

This invention relates to a two-wheeled vehicle and has special reference to a chassis therefor.

It is well known that two-wheeled vehicles such as cycles of the motor scooter type are not comfortable to ride in that their spring arrangements are not adequate. Motor scooters particularly are difficult to ride because of the spring action which produces much discomfort on rough roads, and in addition, the handling of the vehicle is difficult because the driving wheel and steering wheel bounce too much wherein both driving traction and steering traction are imparied.

It is therefore one of the principal objects of my invention to provide an improved chassis including spring suspension for a two-wheeled vehicle.

Another object is to provide a cycle wherein the riding comfort is materially improved over conventional cycles.

Another object is to provide an improved spring suspended steering mechanism for a cycle whereby steering traction for the vehicle is improved materially.

These and other objects and advantages of my invention will become more apparent as the description proceeds.

In the accompanying drawing forming a part of this application:

Figure 1:
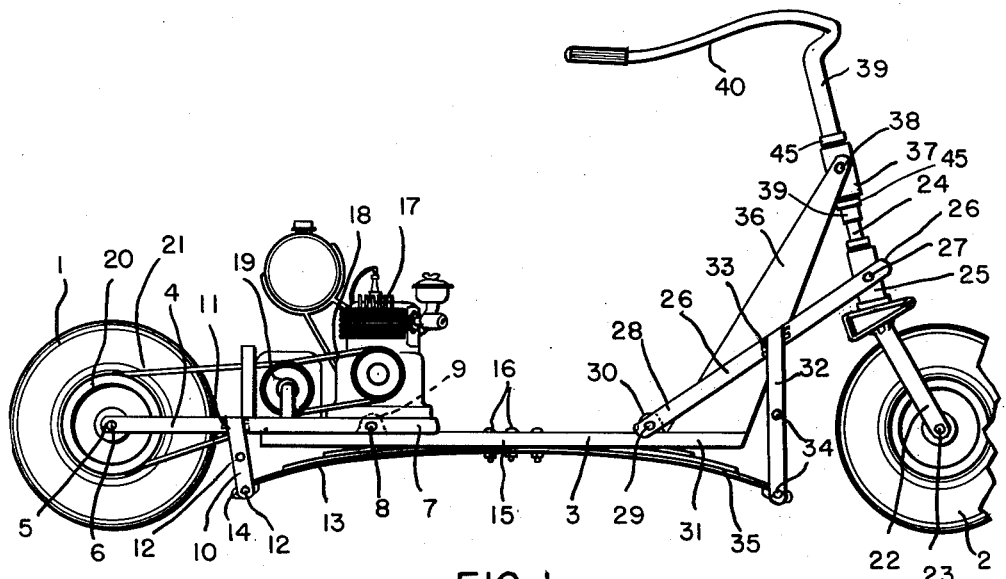
Fig. 1 is a side elevational view of a cycle equipped with my invention.
Figures 2, 3, 4:
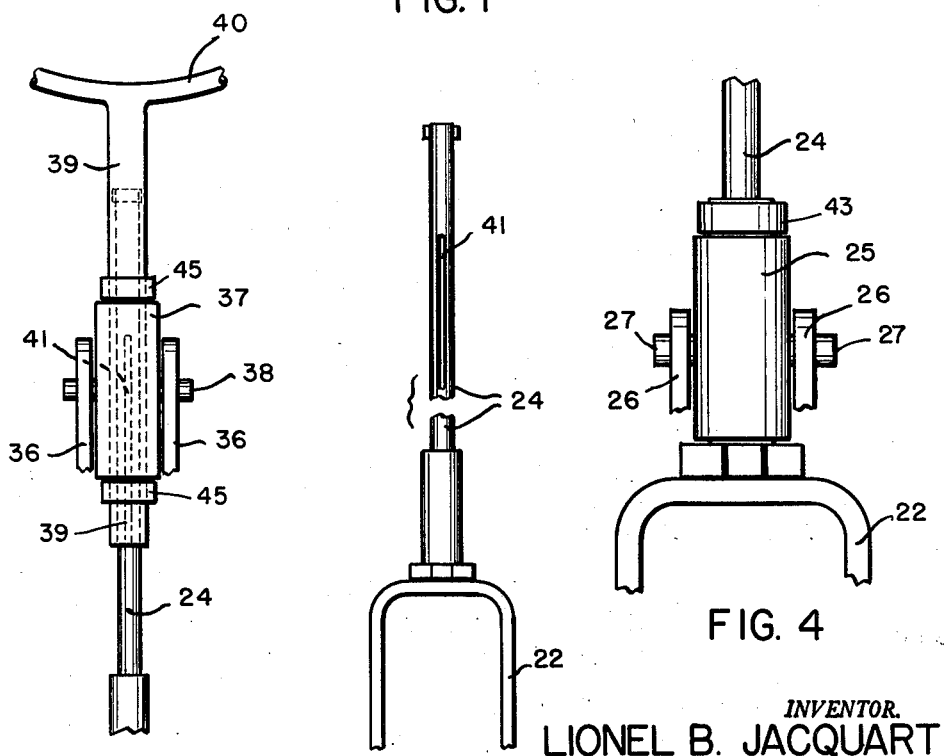
Fig. 2 is a broken front elevational view of the upper steering bearing assembly.
Fig. 3 is a broken front view of the front fork and steering shaft.
Fig. 4 is a view similar to Fig. 2 showing the lower steering bearing assembly.

In the drawing the reference numeral 1 indicates the drive wheel of a cycle, and the numeral 2 indicates the steering wheel thereof. The numeral 3 indicates the main body portion of the chassis of the vehicle which extends between the two wheels but is not secured directly thereto in the preferred embodiment of my invention.

Numeral 4 indicates a fork having alined openings 5 therethrough to receive the axle 6 of the driving wheel 1 to provide a mounting for the wheel 1, the wheel being carried at the rear end of the fork 4. The forward end 7 of the fork 4 is pivotally mounted to the body member 3 of the chassis as by a pin 8 extending through the forward end of the fork and through a suitable bearing 9 carried on the chassis.

The fork 4 has a bracket 10 fixed thereto as at 11 by welding, bolting, or the like, and preferably depending therefrom as shown. The bracket is made up of two spaced members held in spaced relation by suitable pins or spacers 12—12.

A spring 13 is fixed to the chassis and abuts the lower one of the spacers 12, the latter serving as a bearing against which the spring 13 pushes to maintain the fork 4 in its desired relation relative to the chassis under normal conditions and permitting the pivoting of the fork 4 relative to the chassis under conditions where the wheel 1 engages obstructions, thereby cushioning the rider of the vehicle.

As here shown, the spring 13 is of the leaf type and may have any suitable number of leaves, as shown. The rear end 14 of the spring rests on the upper edge of the lower spacer member 12, and the central portion 15 of the spring engages on and is secured to the underside of the member 3 as by bolts 16—16, or the like, to secure the spring in operating position.

As shown in the accompanying drawings, the motor 17 is carried on the forward end 7 of the fork 4 and a flexible connection, such as a V-belt or chain 18 is provided between the motor and transmission member 19. The transmission member 19 is connected to a drive pulley or sprocket 20 by means of a V-belt or chain 21.

It may be seen from the above that a cycle equipped with this rear spring arrangement and motor mounting will readily retain driving traction as the wheel rides over obstructions and into depressions in the terrain over which it travels. The drive wheel is free to follow the contour of the terrain as conditions require, without moving the entire vehicle or chassis of the vehicle by its sudden upward and downward movements. The chassis will readily maintain a substantially even keel even though the drive wheel moves upwardly and downwardly over rough roads thereby providing a smooth ride. The spring 13 will permit the wheel 1 to move up and down, the fork 4 pivoting on the pivot pin 8, thus compressing the spring 13. The spring 13 will return the wheel 1 to its desired normal position as soon as the obstruction is passed by reason of its biasing the rear end of the fork 4 in a downward position.

In my device I provide a spring suspension for the forward wheel too so that it too will be free to traverse bumps and depressions in the road without imparting its movement directly to the chassis to provide discomfort in riding and without impairing the ability of the vehicle to be steered.

The front suspension mechanism includes a fork 22 on which the wheel 2 is rotatably carried as by the axle 23. At the upper end of the fork, the main steering shaft 24 is carried and extends upwardly therefrom. The main steering shaft 24 has a lower steering bearing 25 rotatably mounted thereon at the lower end thereof adjacent the junction of the steering shaft with the fork 22. A collar 43 holds the bearing 25 in place on the shaft 24.

The steering bearing 25 provides a mounting for the front shackle bars 26—26, one bar 26 preferably being mounted on each side of the bearing as by a pin 27 extending from each side of the bearing whereby a pivotal mounting for the forward ends of the bars 26 is provided.

The rear ends 28 of the shackle bars 26 are pivotally mounted as by a pivot pin 29 in a suitable bearing 30 mounted on the forward end 31 of the chassis member 3. The shackle bars 26 have a pair of brackets 32—32 having their upper ends fixed thereto as at 33 and depending therefrom. The shackle members 32 are preferably spaced apart by suitable spacers 34—34 in a manner similar to the bracket 10. The forward end 35 of the spring 13 engages the upper surface of the lowermost pin 34 in a sliding contact in the same manner as the rear end 14 of the spring engages the pin 12 to provide a stop for the spring to permit same to operate and maintain the desired relationship between the chassis 3 and the forward steering mechanism of the vehicle.

To provide the desired stability in the steering mechanism of the vehicle, I have provided a steering support post 36 which is rigidly fixed to the forward end 31 of the chassis 3 and extends upwardly and forwardly therefrom as shown. At the upper end of the steering support post 36, I have provided an upper steering bearing 37, the upper end of the support post being bifurcated to extend on each side of the steering bearing 37 and to be pivotally received on the mounting pins 38—38 on opposite sides of the steering bearing 37.

A steering sleeve 39 is axially rotatably carried in the upper steering bearing 37, the steering sleeve 39 having the handle bars 40 at its upper end as shown to permit the steering of the vehicle in the conventional manner. A collar 45 is secured to the steering sleeve 39 above and below the upper steering bearing 37 to hold the bearing in a fixed relative position to the shaft on sleeve 39.

A spline connection 41 provides a steering connection between the steering sleeve 39 and steering shaft 24. The spline connection 41 permits the reciprocation of the shaft 24 relative to the steering sleeve 39 and the upper steering bearing 37, as is deemed apparent.

It will be seen from the above that the forward suspension for my cycle will permit the movement of the wheel 2 upwardly and downwardly as it passes over rough terrain without imparting the up and down movement directly to the chassis. The spring 13 and the pivotal mounting of the steering mechanism will permit the upward and downward movement in the wheel 2 in this manner, and the steering bearings 25 and 37 will permit steering to take place as it normally would without interference as the vehicle proceeds over rough terrain.

Because the steering wheel 2 will maintain its contact with the ground as it travels along, it will not bounce, as is conventionally experienced, steering of the vehicle will be materially simplified and materially more effective than when the front wheel 2 is bouncing as the vehicle passes over rough terrain. The continuous contact of the wheel 2 with the ground, instead of its bouncing action, obviously will permit the operator of the vehicle to steer accurately and efficiently, and at the same time the operator's ride will be smooth and comfortable. Obviously, the operator, because of his improved comfort, will be better able to handle his vehicle.

It is deemed apparent from the above that a cycle equipped with my spring chassis arrangement will be much safer to ride, as well as being more comfortable in that the drive wheel and the steering wheel constantly engage the ground and the operator is not uncomfortable and annoyed while riding, making him better able to operate the vehicle for his own and others' safety.

Having thus described my invention, what I claim is:

1. Means for mounting the steering wheel of a two-wheeled vehicle to the chassis thereof to permit oscillation of said wheel relative to said chassis, comprising: a steering shaft, a fork at the lower end of said steering shaft for supporting said front wheel, a steering bearing on said steering shaft, shackle bars pivotally connected to said steering bearing and to said chassis, spring means connected between said chassis and portions of said shackle bars to permit oscillation of said wheel relative to said chassis, and support means secured to said chassis and having a reciprocal connection with said shaft in spaced relation to said steering bearing to stabilize said shaft.

2. Means for mounting the front wheel of a two-wheeled vehicle to the chassis thereof to permit oscillation of said wheel relative to said chassis and permit steering of said front wheel, comprising: a steering shaft, a fork at the lower end of said steering shaft for supporting said front wheel, a steering bearing on the lower end of said steering shaft, shackle bars pivotally connected to said steering bearing and to said chassis, spring means connected between said chassis and portions of said shackle bars to permit oscillation of said wheel relative to said chassis, and means joining the upper end of said steering shaft to said chassis to rigidify the steering connection of said front wheel to said chassis, and means on said steering shaft to permit its reciprocation relative to said joining means at the upper end of said steering shaft.

3. Means for mounting the steering wheel of a two-wheeled vehicle to the chassis thereof to permit oscillation of said wheel relative to said chassis and permit steering of said front wheel, comprising: a steering support post carried by said chassis at the forward end thereof and extending upwardly therefrom, an upper steering bearing carried by said support post, a steering sleeve axially rotatably carried in said steering bearing, a steering shaft, a fork at the lower end of said steering shaft for supporting said front wheel, a lower steering bearing on said steering shaft, shackle bars pivotally connected between said lower steering bearing and said chassis, and spring means connected between said chassis and portions of said shackle bars to permit oscillation of said wheel relative to said chassis, and said steering shaft and steering sleeve having a spline connection to permit the reciprocation of said shaft within said sleeve.

References Cited in the file of this patent

UNITED STATES PATENTS

| 1,306,995 | Bradshaw | June 17, 1919 |
| 1,576,216 | Phillips | Mar. 9, 1926 |

FOREIGN PATENTS

| 325,034 | Germany | Sept. 8, 1920 |